Aug. 2, 1955  M. RUDERFER  2,714,703
TRANSDUCER
Filed Oct. 26, 1954  2 Sheets-Sheet 1

FIG. I.

INVENTOR.
MARTIN RUDERFER
BY Leonard H. King
AGENT

2,714,703

TRANSDUCER

Martin Ruderfer, Wantagh, N. Y., assignor to
Avien-Knickerbocker, Inc., Woodside, N. Y.

Application October 26, 1954, Serial No. 464,741

4 Claims. (Cl. 323—74)

This invention relates to electrical transducers and particularly to such transducers of the variable capacitance type; and has for its principal object to provide such a transducer adapted to respond to a wide range of frequencies and pressures and to withstand severe vibration and shocks in usage.

There are many instances making desirable the use of an extremely sensitive transducer device adapted to respond to pressures over a wide range of intensities under adverse conditions of measurement such as exposure to severe vibration. A typical example of this is in making pressure measurements by jet propulsion devices. These pressures occur over a wide range of intensity under severe vibratory conditions and, furthermore, the equipment itself is undergoing severe shock and vibration during use. Accordingly, it is required that a transducer device for picking up or detecting pressure changes must not only be responsive to the variations of pressure intensity and frequency, but must also be able to withstand a very severe vibration due to the operation of the equipment. Furthermore, there is often much heat developed which in itself requires that the pickup device must be able to withstand the severe heat and must not have its response characteristics substantially altered by the change in temperature.

In accordance with my invention there is provided a transducer especially adapted to perform the foregoing purposes. I carry out my invention by the provision of a unique construction and arrangement of a condenser element of a transducer in relation with a flexible diaphragm adapted to receive the pressure changes from the chamber whose pressure is to be measured.

It is also an object of this invention to provide a pressure transducer which will accurately translate pressure change into a change of capacitance as a function of input pressure.

An object of this invention is to provide a variable capacitor maintained in vacuo.

It is another object of this invention to provide a pressure transducer which will produce a capacitance as a function of input pressure and which is not subject to temperature and vibration errors.

A particular object of this invention is to provide a compact pressure transducer.

Other objects and advantages will become apparent from consideration of the following discussion taken into conjunction with the accompanying drawings.

Figure 1:
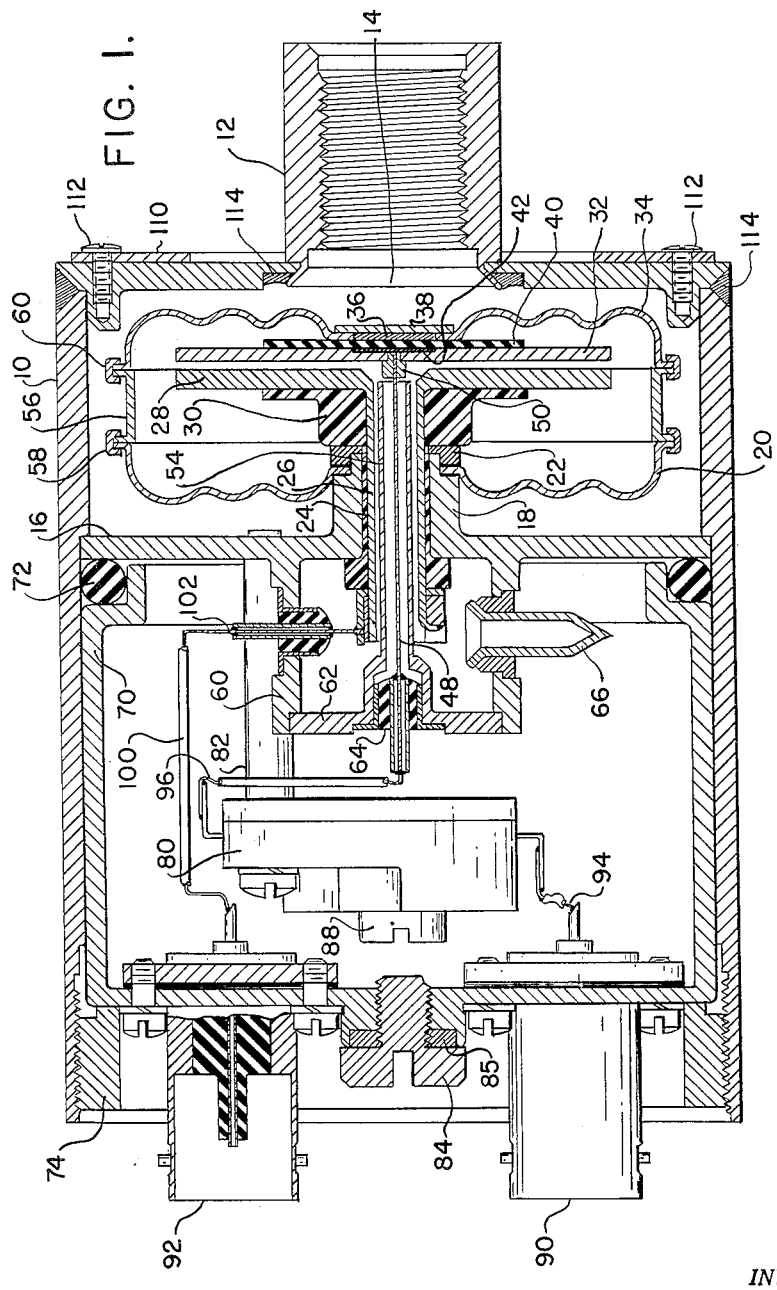
Fig. 1 shows in cross-section a transducer of this invention.
Figure 2:
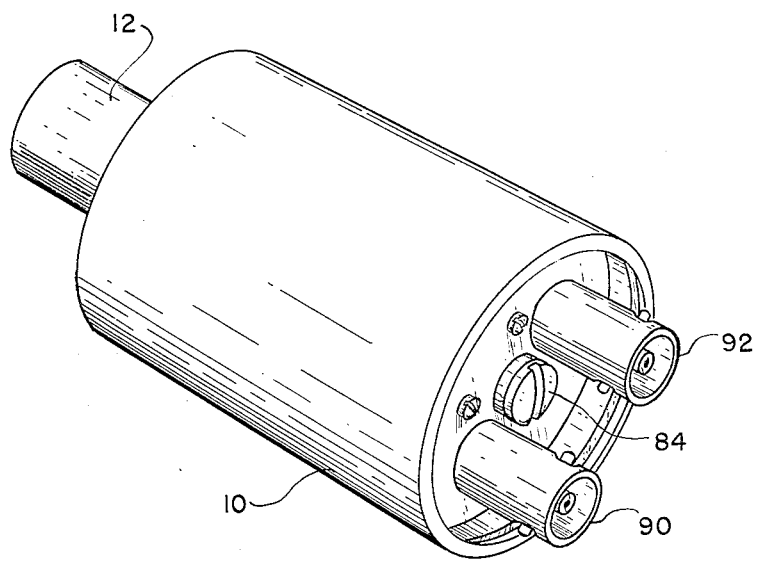
Fig. 2 shows pictorially the transducer of Fig. 1.

Referring now to Fig. 1 there is shown a housing 10 which is provided with a coupling means 12 for attachment of the housing to a chamber whose pressure is to be sensed. Orifice 14 provides means for the pressure of the chamber to be exerted within housing 10. Within housing 10 there is provided a bulkhead member 16. Bulkhead member 16 is provided with a cylindrical portion 18 which serves as a mounting means for diaphragm 20 mounted thereon by retaining ring 22. Ring 22, cylindrical portion 18 and diaphragm 20 are silver soldered to form a unitary structure. Insulator 24 spaces metal tube 26 from cylindrical member 18. Attached to cylinder 26 there is provided a metal plate 28 forming one plate of a sensing capacitor whose capacitance is varied by the pressure under measurement. Insulator 30 provides additional rigidity for plate 28. The other capacitor plate 32 is supported by a deformable diaphragm 34. The method of support is a feature of this invention. Diaphragm 34 is provided with a center opening 36 which is filled with solder with the surface machined flush with the diaphragm. The opening is closed on one side by plate 38 and on the other side by glass insulator 40 which is provided with a metallized portion coinciding with the area of opening 36. In contact with glass insulator 40 and bonded to it, there is provided a solder layer 42 which in turn bonds capacitor plate 32. The method of manufacture comprises the filling of the opening 36 in diaphragm 34 with the solder 42, and then machining the solder flush with the diaphragm. There is assembled thereto, in a jig fixture, diaphragm 34, plate 38, and glass insulator plate 40, which is provided with previously metallized areas corresponding to the region covered by solder area 36 and solder area 42. The elements are assembled together in a jig fixture and then furnace soldered together.

Electrical connection is made through wire 48 which is clamped by metal terminal 50. The terminal 50 is soldered to plate 32. It is preferred to use stranded wire 48 and flare out the end of the wire in circular fashion embedding the individual strands in solder layer 42. Electrostatic shielding for conductor 48 is provided by metal tube 54. Wire 48 is terminated in hermetic seal. Diaphragms 20 and 34 are connected together by a ring assembly consisting of ring 56 and crimp seals 58 and 60. The surfaces to be sealed together are pretinned. By means of a conventional die set the crimp seals are formed in place. The assembly is then soldered together to form a vacuum tight seal. The spacing between capacitor plates 28 and 32 is determined by machining the face of plate 28 to the desired level. A chamber continuous with bulkhead 16 is formed by cylindrical member 60 and is provided with the covering plate 62 provided with a glass hermetic seal 64 to which is sealed wire conductor 48. Exhaust tube 66 provides a means for exhausting the atmosphere from inside the chamber formed by cylindrical member 60, the diaphragm assembly comprising diaphragm 20, ring 56, and diaphragm 34. Within housing 10 there is also provided a second chamber, which is sealed off from the atmosphere comprising, a tubular member 70 which is locked against O ring 72 by the action of ring 74. Trimmer capacitor 80 is provided as a means for adjusting the capacitance of the transducer under conditions of "no-pressure." The capacitor 80 is supported from bulkhead 16 by stud 82. Screw 84 serves as a means to provide access to screwhead 88. Gasket 85 provides a seal when screw 84 is tightened. Capacitor 80 may be adjusted by turning screwhead 88 from outside housing 10 without disturbing the seal within the diaphragm assembly. A suitable trimmer capacitor 80 is style TS2A ceramic trimmer manufactured by the Erie Resistor Corp, Erie Pennsylvania.

Terminal 90 is connected by means of lead 94 to trimmer capacitor 80. In turn, lead 96 connects trimmer capacitor 80 to lead 48. Terminal 92 is connected by means of lead 100 to hermetically sealed terminal 102 which in turn is electrically connected to plate 28 by member 26.

I prefer to form the diaphragms 20 and 32 and ring 56 of ni-span-c- which is a nickel-chromium-iron-titanium alloy having the property of maintaining a constant modulus of elasticity over the usual temperature range of —50° to +150° F. Ni-span-c is a product of the H. A. Wilson Co., Newark, N. J. The diaphragm corrugation is designed to provide a linear characteristic in accordance with National Bureau of Standards report entitled, "Corrugated Metal Diaphragm for Aircraft Pressure Instruments" by W. A. Wildhack and V. H. Goerke.

A feature of the particular diaphragm-capacitor assembly of this invention is the physically small structure for maintaining capacitor plates 28 and 32 in vacuo. It is to be noted that the structure utilizes but few parts.

Nameplate 110 is affixed to housing 10 by means of screws 112. Housing 10 is composed of several sections which are joined by solder joints 114.

What I claim as new is:

1. In a transducer, the combination comprising: a first diaphragm of annular configuration having an inner and outer radius, said diaphragm being adapted to be deformed in accordance with variations of pressure of an atmosphere to which it is exposed, a cylindrical supporting member having one end attached to said diaphragm about said inner radius, a housing member provided with an orifice for exposing said diaphragm to said atmosphere, means for supporting said cylindrical member inside said housing, a cylindrical ring member attached to said first diaphragm about said outer radius, a second pressure deformable diaphragm of circular configuration attached to said ring about its outer radius, a wall enclosing the other end of said cylindrical support member so as to provide a space defined by said wall, said cylindrical support member, said diaphragms, and said ring, a first insulator supported inside said cylindrical support member, an electroconductive tubular member supported by said first insulator, a fixed capacitor plate supported by said tubular member, a second insulator attached to said circular diaphragm, a movable capacitor plate affixed to said second insulator and parallel to said first fixed capacitor plate, a first hermetically sealed terminal extending through said wall, electrically shielded conductor means interconnecting said movable capacitor plate and said first hermetically sealed terminal, a second hermetically sealed terminal extending through said wall, and means electrically connecting said electroconductive member and said second terminal.

2. In a transducer, the combination comprising: a first diaphragm of annular configuration having an inner and outer radius, said diaphragm adapted to be deformed in response to pressure applied thereto, a cylindrical supporting member having one end attached to said diaphragm about said inner radius, a housing member provided with an orifice for exposing said diaphragm to said atmosphere, means for supporting said cylindrical member inside said housing, a cylindrical ring member attached to said first diaphragm about said outer radius, a second pressure deformable diaphragm of circular configuration attached along its circumference to said ring, a wall enclosing the other end of said cylindrical support member so as to provide a space defined by said wall, said cylindrical support member, said diaphragms, and said ring, a cylindrical insulator supported inside said cylindrical support member, an electroconductive tubular member supported by said cylindrical insulating member, a fixed capacitor plate supported by said tubular member, a flat insulator attached to said circular diaphragm, a movable capacitor plate affixed to said flat insulator and parallel to said first fixed capacitor plate, a first hermetically sealed terminal extending through said wall, electrically shielded conductor means connected to said movable capacitor plate and said first hermetically sealed terminal, a second hermetically sealed terminal extending through said wall, and means electrically connecting said electroconductive member and said second terminal.

3. In a transducer, the combination comprising: a first diaphragm of annular configuration having an inner and outer radius, said diaphragm being adapted to be deformed in accordance with variations of pressure of an atmosphere to which it is exposed, a cylindrical supporting member having one end attached to said diaphragm about said inner radius, a housing member provided with an orifice for exposing said diaphragm to said atmosphere, means for supporting said cylindrical member inside said housing, a cylindrical ring member attached to said first diaphragm about said outer radius, a second pressure deformable diaphragm of circular configuration attached to said ring about its outer radius, a wall enclosing the other end of said cylindrical support member so as to provide a space defined by said wall, said cylindrical support member, said diaphragms, and said ring, a first insulator supported inside said cylindrical support member, an electroconductive tubular member supported by said first insulator, a fixed capacitor plate supported by said tubular member, a flat glass insulator having metallized portions on opposite faces, one of said metallized portions being soldered to said circular diaphragm, a movable capacitor plate parallel to said first fixed capacitor plate soldered to said metallized portion of said other face of said insulator, a first hermetically sealed terminal extending through said wall, electrically shielded conductor means interconnecting said movable capacitor plate and said first hermetically sealed terminal, a second hermetically sealed terminal extending through said wall, means electrically connecting said electroconductive member and said second terminal.

4. In a transducer, the combination comprising: a first diaphragm of annular configuration having an inner and outer radius, said diaphragm being adapted to be deformed in accordance with variations of pressure of an atmosphere to which it is exposed, a cylindrical supporting member having one end attached to said diaphragm about said inner radius, a housing member provided with an orifice for exposing said diaphragm to said atmosphere, means for supporting said cylindrical member inside said housing, a cylindrical ring member attached to said first diaphragm about said outer radius, a second pressure deformable diaphragm of circular configuration having its outer radius affixed to said ring, a wall enclosing the other end of said cylindrical support member so as to provide a space defined by said wall, said cylindrical support member, said diaphragms, and said ring, a first insulator supported inside said cylindrical support member, an electroconductive tubular member supported by said first insulator, a fixed capacitor plate supported by said tubular member, a second insulator attached to said circular diaphragm, a movable capacitor plate affixed to said second insulator and parallel to said first fixed capacitor plate, a first hermetically sealed terminal extending through said wall, electrically shielded conductor means interconnecting said movable capacitor plate and said first hermetically sealed terminal, a second hermetically sealed terminal extending through said wall, means electrically connecting said electroconductive member and said second terminal, a trimmer capacitor in series with one of said capacitor plates, means to seal said capacitor within said housing, and means for providing access to said trimmer from outside said housing.

No references cited